United States Patent
Alagiannis et al.

(10) Patent No.: US 12,339,849 B1
(45) Date of Patent: Jun. 24, 2025

(54) IN-MEMORY PROCESSING OF UNBOUNDED RECURSIVE GRAPH QUERIES IN RELATIONAL DATABASES

(71) Applicant: Oracle International Corporation, Redwood Shores, CA (US)

(72) Inventors: Ioannis Alagiannis, Zurich (CH); Vlad Ioan Haprian, Zurich (CH); Laurent Daynes, Saint-Ismier (FR); Hugo Kapp, Zurich (CH); Chun-Hung Tseng, Ecublens (CH); Sungpack Hong, Palo Alto, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 18/615,056

(22) Filed: Mar. 25, 2024

(51) Int. Cl.
*G06F 16/00* (2019.01)
*G06F 16/2455* (2019.01)

(52) U.S. Cl.
CPC ............................ *G06F 16/2455* (2019.01)

(58) Field of Classification Search
CPC ................................................. G06F 16/2455
USPC ........................................................ 707/769
See application file for complete search history.

(56) References Cited

U.S. PATENT DOCUMENTS

| | | | |
|---|---|---|---|
| 11,093,459 B2* | 8/2021 | Arnaboldi | G06F 16/27 707/707 |
| 11,392,624 B2 | 7/2022 | Haprian et al. | |
| 11,500,868 B2 | 11/2022 | Segalini et al. | |
| 2020/0412686 A1* | 12/2020 | Schomp | H04L 45/748 707/707 |
| 2021/0124782 A1* | 4/2021 | Karaca | G06F 16/90328 707/707 |
| 2022/0114178 A1* | 4/2022 | Haprian | G06F 16/24539 707/707 |
| 2022/0129451 A1* | 4/2022 | Haprian | G06F 16/252 707/707 |
| 2022/0129461 A1* | 4/2022 | Haprian | G06F 16/24526 707/707 |

(Continued)

OTHER PUBLICATIONS

Michels, Jan, "Property Graph Data Model—The Proposal", Individual Expert Contribution, 76 pages.

*Primary Examiner* — Alexandria Y Bromell
(74) *Attorney, Agent, or Firm* — Hickman Becker Bingham Ledesma LLP; Marcel K. Bingham (57) ABSTRACT

A computer-implemented method includes receiving a graph pattern matching query, determining that the query is an unbounded recursive path query (RPQ), and initializing an unbounded root vertex match operator (UBRM) using a starting vertex as input to the UBRM; the UBRM is configured to compute multiple hops between vertices on the graph. The method also includes performing a first reachability search using the UBRM; the UBRM traverses the graph to identify all vertices reachable from the starting vertex. The method further includes generating first level vertices of a path pattern that computes the RPQ; and adding the first level vertices to a first level context for processing by a successor match operator; the successor match operator comprises an unbounded intermediate neighbor match operator (UBNM), the UBNM is configured to compute multiple hops between vertices on the graph and to identify neighbors for each of the first level vertices.

20 Claims, 7 Drawing Sheets

(56) References Cited

U.S. PATENT DOCUMENTS

| | | | |
|---|---|---|---|
| 2023/0083916 A1* | 3/2023 | Giovannini | G16H 40/20 707/722 |
| 2024/0126764 A1* | 4/2024 | Haprian | G06F 16/2433 707/707 |
| 2024/0273094 A1* | 8/2024 | Seul | G06F 16/2443 707/707 |
| 2024/0273103 A1* | 8/2024 | Seul | G06F 16/2456 707/707 |

* cited by examiner

IN-MEMORY PROCESSING OF UNBOUNDED RECURSIVE GRAPH QUERIES IN RELATIONAL DATABASES

FIELD OF THE INVENTION

The present invention relates to computing using relational databases, and more particularly to a technique for in-memory processing of unbounded recursive path queries (RPQs) in a single-machine relational database system.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Graph processing is an important tool for data analytics. Relational database management systems (DBMSs) increasingly allow their users to define property graphs from relational tables and to query them using graph pattern matching queries. Most products limit users to define a graph out of a single vertex table and edge table. These graphs are called homogeneous graphs. The most advanced systems may define a graph out of multiple vertex and edge tables. For example, a heterogeneous graph may be created out of the existing tables in a database by mapping every dimension table to a vertex table and every fact table to an edge table. The only constraint is that vertex tables should have a primary key column and the edge tables should associate foreign keys corresponding to the primary keys into two different/same vertex tables.

Graph querying and pattern matching enables interactive exploration of graphs. Pattern matching refers to finding patterns in the graph that are homomorphic to a target pattern, such as a triangle. In addition to the structural pattern, the user can add projections, filters, etc. Graph queries present a very challenging workload as they focus on edges, i.e., the connections in the data. Therefore, executing graph queries might explore immense amounts of intermediate results and queries can quickly explode in terms of memory usage. Additionally, graph queries exhibit very irregular access patterns with limited memory locality, as the query patterns and the connections in the data dictate the accesses.

Unbounded recursive graph queries (i.e., recursive path queries or RPQs) refer to graph queries whose path pattern has unknown length and compute paths that connect the source vertex and destination vertex of the path by zero or more matches of a given pattern (e.g., (a)→*(b)). Computing RPQs requires extensive computation, since it is necessary to find the transitive closure of a (sub) graph (that is, given two vertices a and b from the input graph, find whether there is a path between the given pair of vertices <a,b>).

Techniques that DBMSs might adopt to support unbounded RPQs include (i) using the WITH clause to perform the graph traversal recursively; (ii) translating the graph query into a join query and processing that query with an SQL engine. Expressing unbounded RPQs using the WITH clause is complex, and is not very flexible when adapting the query to new requirements (e.g., changing a vertex or an edge) while the performance significantly drops as the graph size increases. On the other hand, translating the graph query requires knowledge regarding characteristics of the graph (e.g., diameter), and may result in a very large Structured Query Language (SQL) query (hundreds of megabytes) that is expensive to compile and/or optimize (i.e., many sub-queries connected with UNION ALL where each sub-query includes a large number of joins). Additionally, both approaches need to be further filtered with DISTINCT to return the shortest paths for the unbounded RPQ. Both approaches attempt to compute unbounded RPQs by emulating a graph traversal in SQL (e.g., using abstraction from the relational algebra); however, they are not designed for this purpose and thus deliver suboptimal performance.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Further, it should not be assumed that any of the approaches described in this section are well-understood, routine, or conventional merely by virtue of their inclusion in this section.

DETAILED DESCRIPTION

In the following description, for the purposes of explanation, numerous specific details are set forth in order to provide a thorough understanding of the present invention. It will be apparent, however, that the present invention may be practiced without these specific details.

The following applications are related to the present disclosure and are each incorporated herein by reference in their entirety:

U.S. application Ser. No. 16/710,740 (now U.S. Pat. No. 11,392,624)

U.S. application Ser. No. 16/710,719 (now U.S. Pat. No. 11,392,623)

U.S. application Ser. No. 16/710,715 (now U.S. Pat. No. 11,397,732)

U.S. application Ser. No. 16/747,827 (now U.S. Pat. No. 11,093,459)

U.S. application Ser. No. 17/080,698 (now U.S. Pat. No. 11,567,932)
U.S. application Ser. No. 17/086,719 (now U.S. Pat. No. 11,507,579)
U.S. application Ser. No. 17/162,567 (now U.S. Pat. No. 11,500,868)
U.S. application Ser. No. 16/778,668 (now U.S. Pat. No. 11,675,785)
U.S. application Ser. No. 16/280,591 (U.S. Pub. No. 2020/0265090)
U.S. application Ser. No. 17/080,700 (U.S. Pub. No. 2022/0129461)

1. General Overview

In accordance with aspects of the disclosure, new capabilities for in-memory processing of unbounded recursive path queries (RPQs) are provided by an Unbounded Root Vertex Match operator (UBRM) that generates first-level vertices of a path pattern based on a starting vertex, and an Unbounded Intermediate Neighbor Match operator (UBNM) that produces neighbors for each of a set of source vertices. The UBRM and UBNM can perform reachability searches to identify all vertices reachable from the starting vertex, and can dynamically compute multiple hops on the graph.

In accordance with additional aspects of the disclosure, techniques for in-memory processing of unbounded recursive path queries (RPQs) are based on a hybrid in-memory Breadth-First Search-Depth-First Search (BFS-DFS) approach, with the addition of the UBRM and UBNM allowing for reachability searches to efficiently compute recursive graph pattern path matches. This enables unbounded regular path queries inside an in-memory pipelined execution engine and allows for efficiently leveraging the graph structure to discover connections within the stored data.

2. Graph Matching Operators for Processing Recursion

Figure 1:
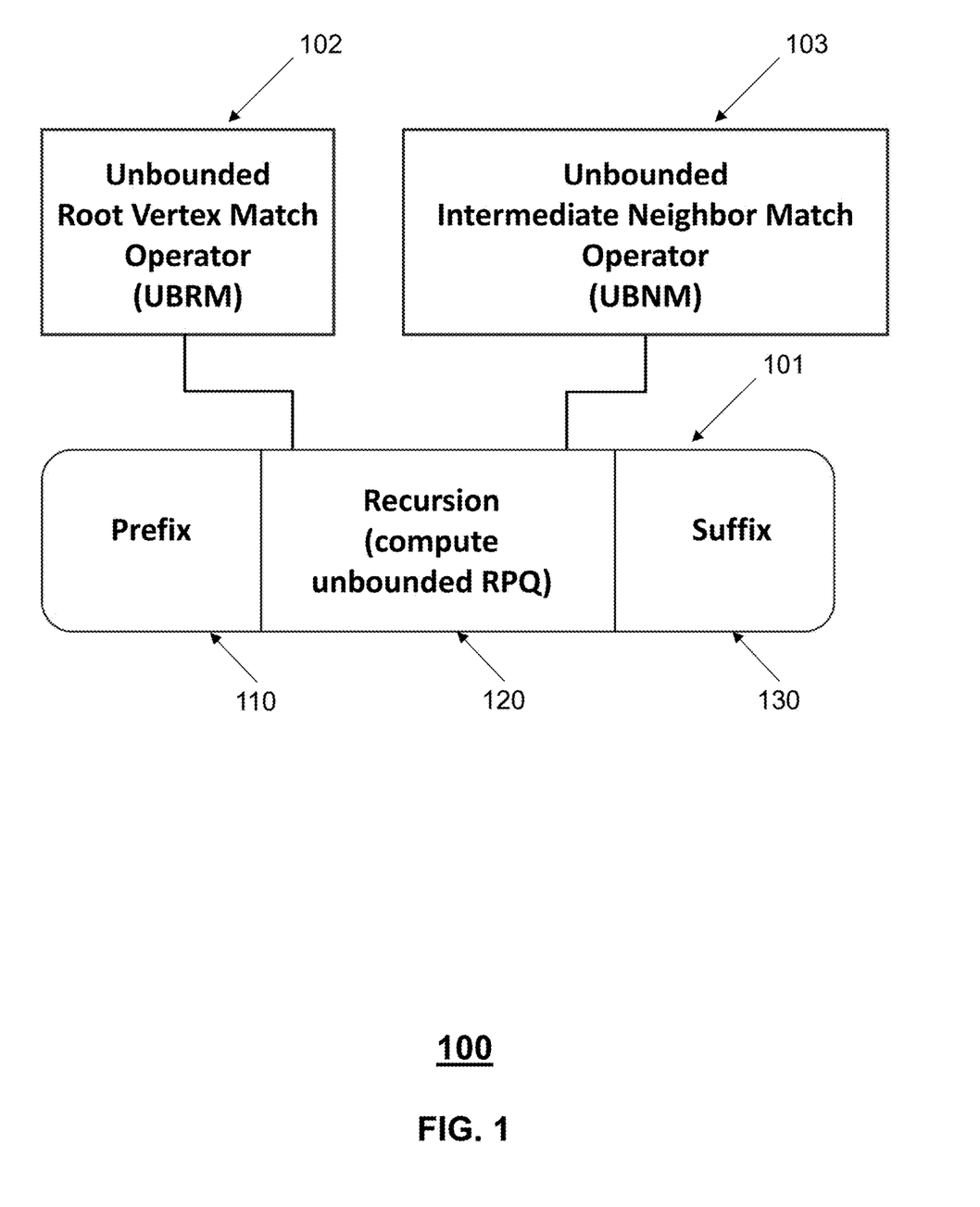
FIG. 1 schematically illustrates an unbounded RPQ including a recursive portion that is processed in accordance with embodiments of the disclosure.

FIG. 1 is a schematic illustration 100 of an unbounded RPQ 101 that is processed according to embodiments of the disclosure. The RPQ includes a prefix 110, a recursion portion 120 and a suffix 130. The recursion portion is processed using an Unbounded Root Vertex Match operator (UBRM) 102 and an Unbounded Intermediate Neighbor Match operator (UBNM) 103. The UBRM operator generates the first level vertices of a path pattern that computes an RPQ. The UBNM operator uses a set of source vertices to produce neighbors for each of those source vertices according to an RPQ.

In various embodiments, reachability searches can be performed by computing reachability between two graph vertices using a Breadth-First Search (BFS) algorithm; this enables efficient computation of the unbounded recursive graph queries (RPQs). This approach exploits an in-memory representation of the graph that uses a compressed sparse row (CSR) format to efficiently traverse the graph (In-Memory-Graph-Topology). The BFS algorithm works in an iterative manner; having matches for a prefix pattern, it computes all the matches for the prefix extended with an extra hop. An advantage of this approach is that the processing system can keep track of the neighbors of each node and performs a scan only over the neighbors of a node when it is needed.

Figure 2:
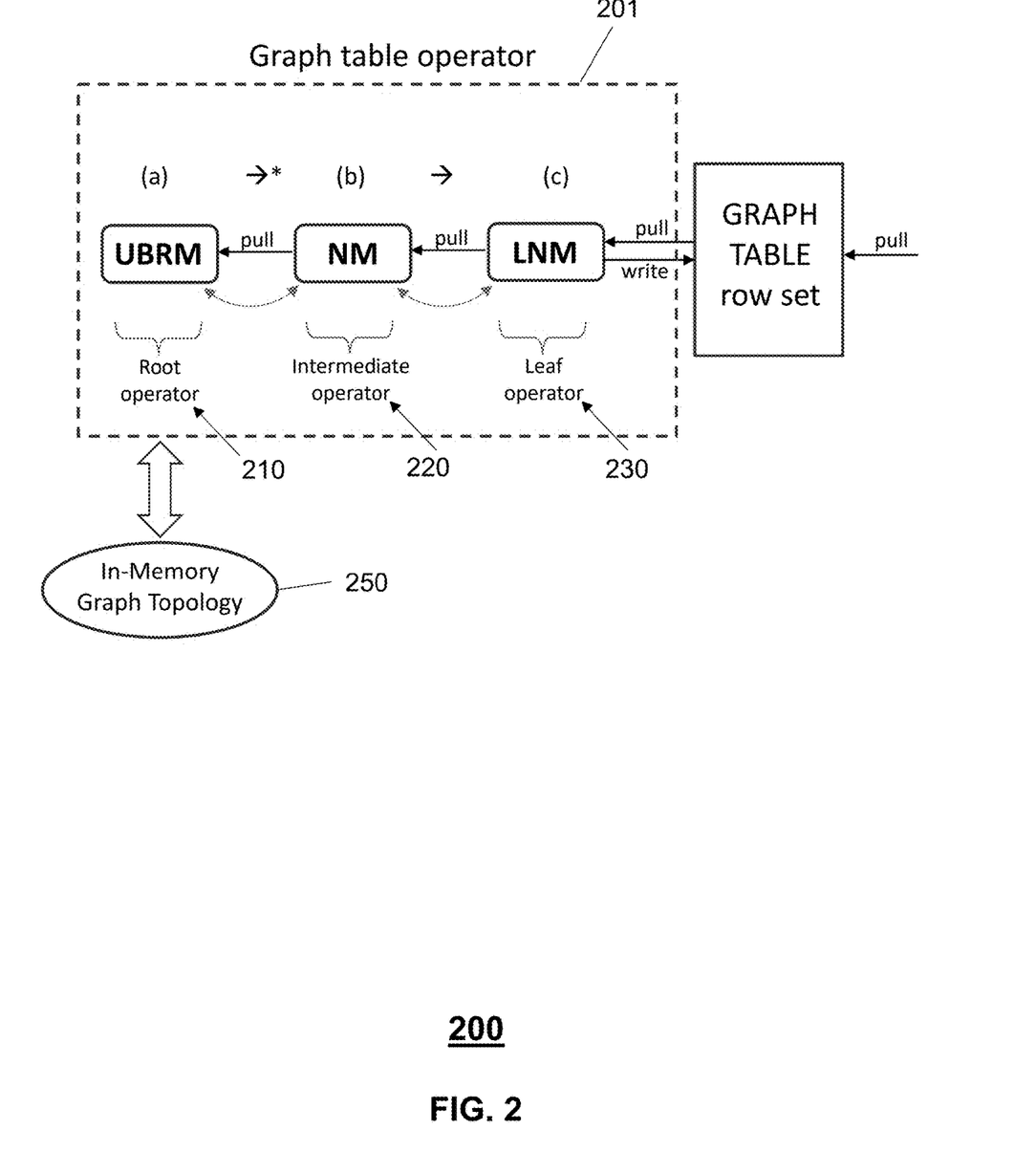
FIG. 2 schematically illustrates an RPQ execution chain that includes a matching operator in accordance with an embodiment of the disclosure.

FIG. 2 is a schematic illustration 200 of an RPQ execution chain that includes a UBRM matching operator in accordance with an embodiment of the disclosure. As shown in FIG. 2, the UBRM operator 210 is chained (that is, arranged in a control flow) with intermediate matching operator NM 220 and leaf operator LNM 230 for an input query (a)→*(b)→(c), where the recursive portion is (a)→*(b).

The GRAPH_TABLE database operator 201 computes all the paths (sequences of vertices/edges that can repeat) matching a given path pattern on a given graph. Graph matching operators (e.g., intermediate operator NM 220) compute vertices for a specific hop of a path pattern. The GRAPH_TABLE operator exploits an in-memory representation of a graph that uses a compressed sparse row (CSR) format to process graph queries (In-Memory Graph Topology 250).

The main operation of the GRAPH_TABLE operator is to compute the paths matching an input path pattern expression on a given graph and project their property values. A path pattern expression is computed using a sequence of graph match operators. Each graph match operator processes a single hop in a path (i.e., source+edge to follow+destination) and consumes the results (if any) of the previous graph match operators (unless it is the first graph match operator, i.e. the root operator). The first graph match operator of a path expression consumes the source vertex tables of a graph and computes a number of matching source vertices. Those matching source vertices become the source to the next operator in the path pattern expression which produces a new set of matching vertices corresponding to that stage (and edges that lead to these vertices). When the last operator has computed its matching vertices, the GRAPH_TABLE operator can produce the entire path match. When one or more paths have been computed, their property values are projected (if any) and the computed rows are returned to the parent operator of the GRAPH_TABLE operator which then consumed them.

Architectures for processing graph queries may include graph match operators for computing vertices for a specific hop of a path pattern: the Root Vertex Match (RM) operator for finding the first-level vertices of a path pattern, the Intermediate Neighbor Match (NM) operator for non-leaf level neighbor matches and the Leaf Neighbor Match (LNM) operator to match leaf level vertices. However, those matching operators are not sufficient to express the recursive part of the unbounded RPQs since they are designed to compute a specific hop.

According to embodiments of the disclosure, the Unbounded Root Vertex Match (UBRM) and Unbounded Intermediate Neighbor Match (UBNM) operators can compute multiple hops (that is, perform a reachability search). In addition, they can be connected as part of the existing chain and consume available neighbors from its successor in the chain and feed with matching neighbors their predecessor. A UBRM operator can be chained with a NM, LNM and UBNM node depending on the type of the query. A UBNM operator can be chained with an RM, UBRM, UBNM, NM or LNM operator. In various embodiments, the UBRM and UBNM matching operators exploit the same reachability search, although they differ with regard to the control flow.

During the semantic analysis phase of query processing, information from the parser is used to determine that an unbounded RPQ needs to be processed as part of the input query. Then, either an UBRM or an UBNM matching operator is generated (UBRM for finding first level vertices and UBNM for other levels) and added in the execution chain. The unbounded matching operators are initialized with graph-related metadata and with semantic information regarding the labels, filters and/or aggregations that may need to be computed within the matching operator.

The UBRM and UBNM can compute multiple hops by performing a reachability search (finding reachable vertices in the graph). The search may be implemented in a variety of ways. In a particular embodiment, the architecture may support multiple implementations, and the processing system can decide at runtime according to the available resources (e.g., memory, CSRs available in the in-memory graph topology) which one to choose.

A breadth-first search (BFS) or depth-first search (DFS) algorithm can be used for the reachability search, or some other multi-source shortest path algorithm. In an embodiment, the unbounded matching operators perform the reachability search using breadth-first search (BFS) semantics. The BFS search begins to traverse the graph from a starting source vertex, progressively explores all the neighbor/unexplored vertices, and computes the distance in number of hops for all reachable vertices from the source vertex within the graph. The reachable vertices are found by exploiting the existing neighbor iterators of the in-memory graph representation to traverse the graph, operate over vertices (or edges), find the out-neighbors (outgoing edges) of a source vertex, or find the in-neighbors (incoming edges) of a destination vertex. The output of the reachability search can be realized as an in-memory temporal array that contains the distance in number of hops for all vertices reachable from the starting vertex.

For computation that requires access to properties (e.g., filters, aggregations, etc.), the BFS implementation of the reachability search allows for storing vertex (edge) properties in in-memory segmented arrays, using one segmented array for each one of the vertex (edge) tables for the properties. For a given vertex, property values are indexed by their image identifier (IMGID) in the segmented array. This approach allows the reachability search to work directly on a copy of the data and avoid random accesses to properties via table scans.

In various embodiments, a path pattern expression is computed using a sequence of graph match operators. Each matching operator (other than the root match operator) consumes the results (if any) of the previous graph match operators and produces a new set of matching vertices corresponding to that stage (unless it is the last graph match operator, i.e. the leaf operator). RM and NM matching operators can be used to initialize a CSR iterator to produce the next set of reachable vertices. However, those CSR iterators process a single hop in a path (i.e., source+edge to follow+destination) and are not suitable for the UBRM and UBNM unbounded matching graph operators which dynamically compute multiple hops.

3. Reachability Neighbor Iterator

In an embodiment, a new type of neighbor iterator for the unbounded matching graph operator, referred to herein as a reachability neighbor iterator, can trigger the reachability search when a UBRM or UBNM matching operator is to be processed, and can consume in batches the generated results of the reachability search.

Figure 3:
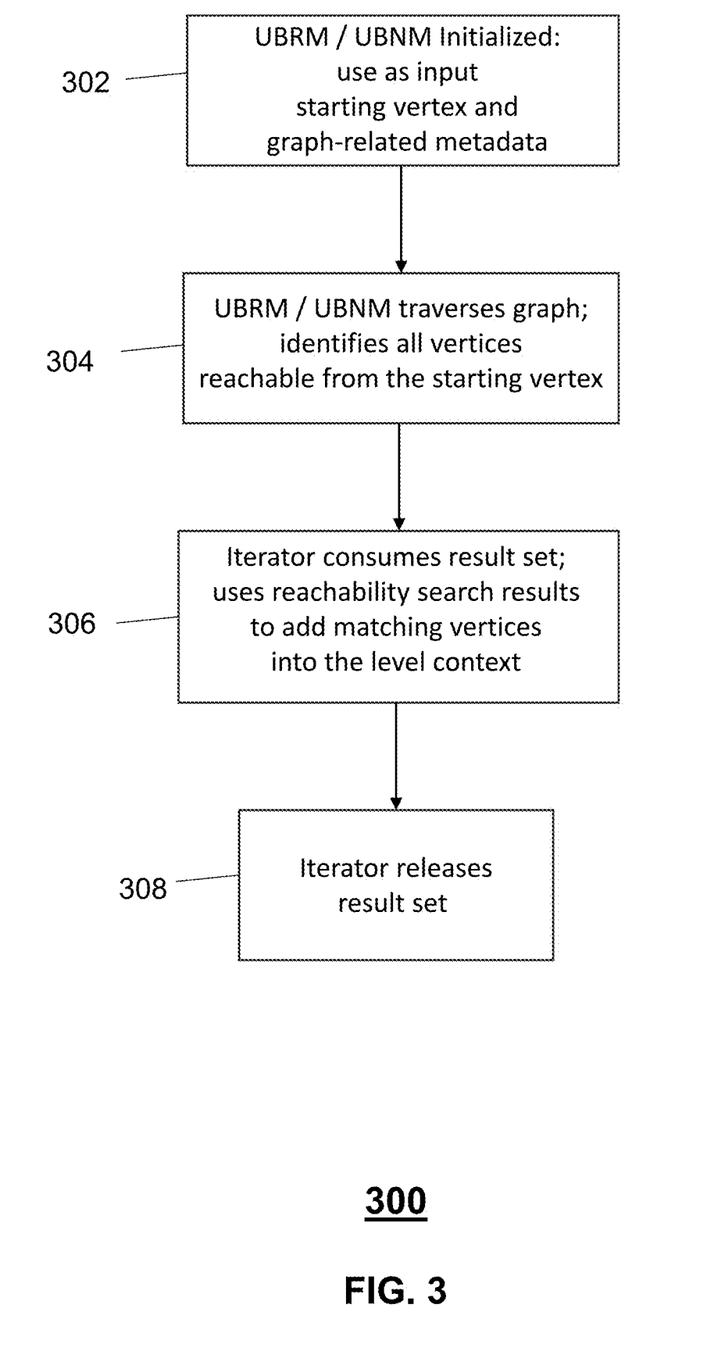
FIG. 3 illustrates a reachability search including functions performed by a reachability neighbor iterator and an unbounded match operator, in accordance with embodiments of the disclosure.

FIG. 3 is a schematic illustration 300 of stages in a reachability search that uses an unbounded match operator (UBRM or UBNM) and a reachability neighbor iterator, in accordance with embodiments of the disclosure. At 302, the unbounded match operator (UBRM or UBNM) is initialized, using as input a starting vertex and required graph-related metadata. The unbounded match operator then traverses the graph and identifies all vertices reachable from the starting vertex (stage 304), generating a result set for the reachability search. At 306, the iterator consumes the result set and adds the matching vertices to the level context so that the next matching operator can process them. At 308, the iterator releases the result set.

Figure 4:
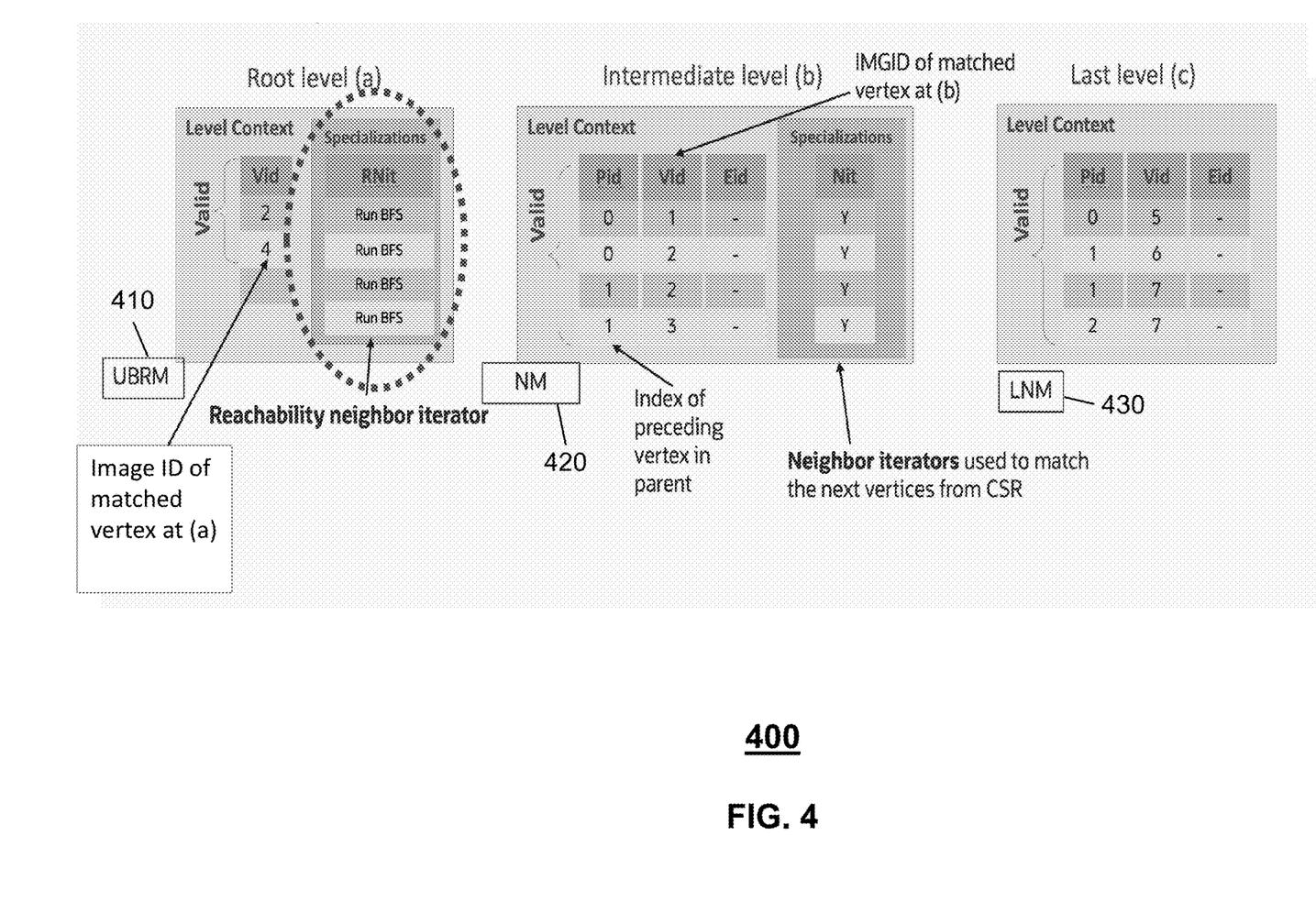
FIG. 4 schematically illustrates a graph table with a matching operator and reachability neighbor iterators, in accordance with an embodiment of the disclosure.

FIG. 4 schematically illustrates 400 a graph table with a matching operator and reachability neighbor iterators, in accordance with an embodiment of the disclosure. Specifically, FIG. 4 shows a possible snapshot at a given execution time for an instance of a UBRM match operator with four reachability neighbor iterators running and an NM match operator that has begun consuming the reachable vertices. At the root level (a), a UBRM 410 identifies vertices reachable from a starting vertex having identifier Vid, and four reachability neighbor iterators RNit run a BFS search algorithm. At intermediate level (b), an intermediate neighbor match (NM) operator 420 and neighbor iterators perform a matching procedure to generate a set of matching intermediate-neighbor vertices. At the last level (c), a leaf neighbor match (LNM) operator generates a set of matching leaf-neighbor vertices.

In an embodiment, the unbounded graph matching operator can allocate once and reuse the graph-related metadata, provided there are no changes in the graph. This can reduce the overhead of initializing the reachability search.

4. RPQ Processing Procedure

Figure 5:
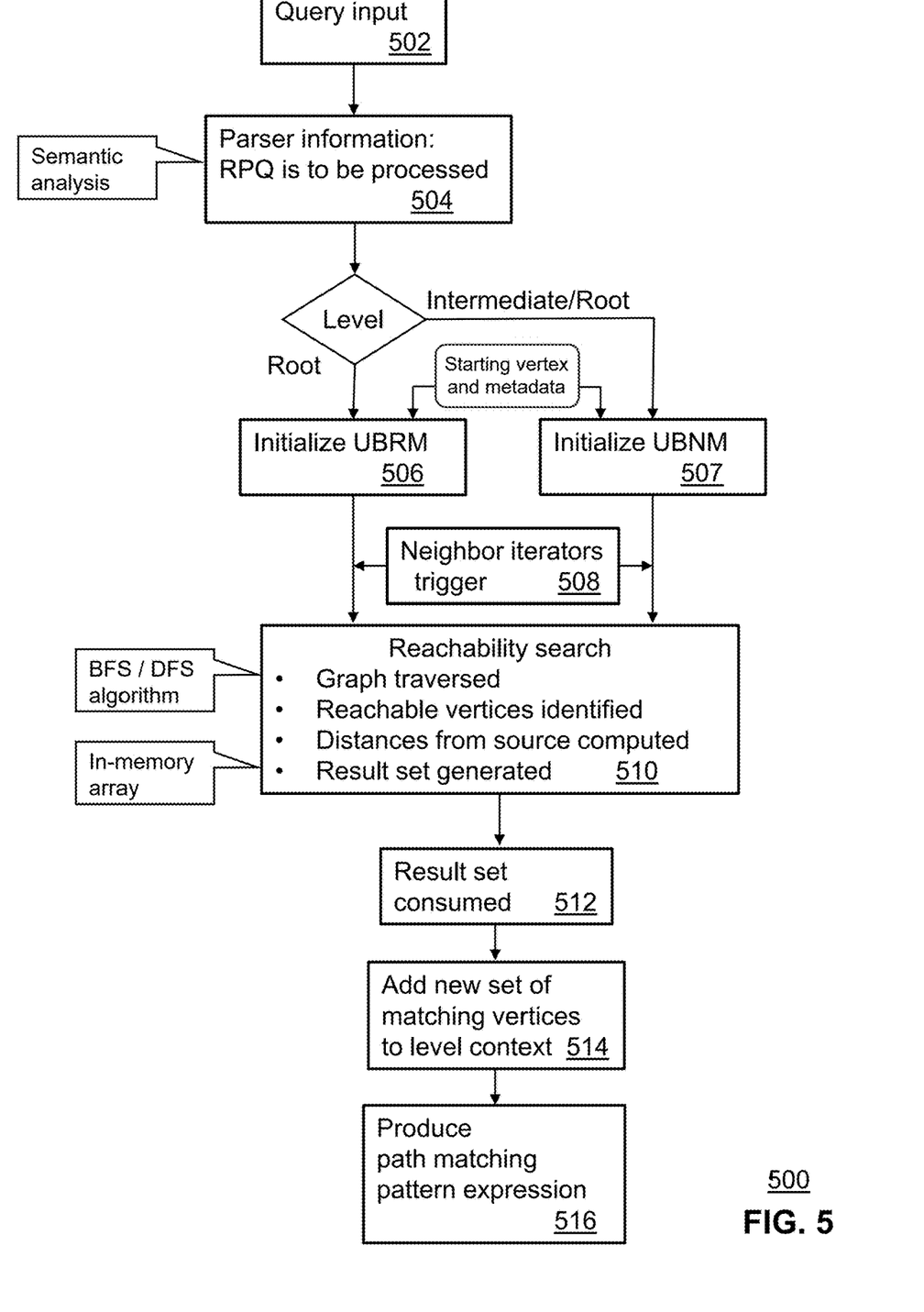
FIG. 5 is a flowchart depicting a procedure for processing an unbounded RPQ, in accordance with embodiments of the disclosure.

FIG. 5 is a flowchart depicting a procedure 500 for processing an unbounded RPQ, in accordance with embodiments of the disclosure. In step 502, a query is input to a processing system; the processing system determines, using information from a parser, that an unbounded RPQ is to be processed (step 504). A UBRM or UBNM matching operator is initialized (UBRM at step 506 for finding first level vertices and UBNM at step 507 for other levels). The unbounded matching operators are initialized with a starting vertex and graph-related metadata. In various embodiments, the matching operators are also initialized with semantic information regarding the labels, filters and/or aggregations that may need to be computed.

The reachability neighbor iterator(s) trigger a reachability search (step 508). In the reachability search (step 510), the graph is traversed from the starting vertex (source vertex); reachable vertices are identified; a distance from the source vertex, expressed in a number of hops, is computed for all the reachable vertices; and results are generated and stored. In an embodiment, the result set is stored in an in-memory array that includes the distance for all the reachable vertices from the starting vertex.

The results of the reachability search are consumed (step 512) and a new set of matching vertices is produced (step 514). In particular embodiments, one or more reachability neighbor iterators associated with a UBRM or UBNM trigger the reachability search, consume the results in batches, and add the new matching vertices to the level context for processing by the next matching operator. In an embodiment, when the last operator has computed its matching vertices, the GRAPH_TABLE operator can produce the entire path match to a given path pattern on the graph (step 516).

It will be appreciated that the techniques described herein can leverage the in-memory representation in the in-memory runtime to compute unbounded recursive path queries with better performance and without the drawbacks associated with using a "WITH clause" or "join operators."

5. Alternatives and Extensions

One or more of the functions attributed to any process described herein, according to one or more embodiments, may be performed any other logical or physical entity, according to one or more embodiments. In various embodiments, each of the techniques and/or functionality described herein is performed automatically and may be implemented using one or more computer programs, other software elements, and/or digital logic in any of a general-purpose computer or a special-purpose computer, while performing data retrieval, transformation, and storage operations that involve interacting with and transforming the physical state of memory of the computer.

6. Hardware Overview

An application or database server instance runs on a computing device and comprises a combination of software and allocation of resources from the computing device. Specifically, an application is a combination of integrated software components and an allocation of computational resources, such as memory, and/or processes on the computing device for executing the integrated software components on a processor, the combination of the software and computational resources being dedicated to performing the stated functions of the application.

Figure 6:
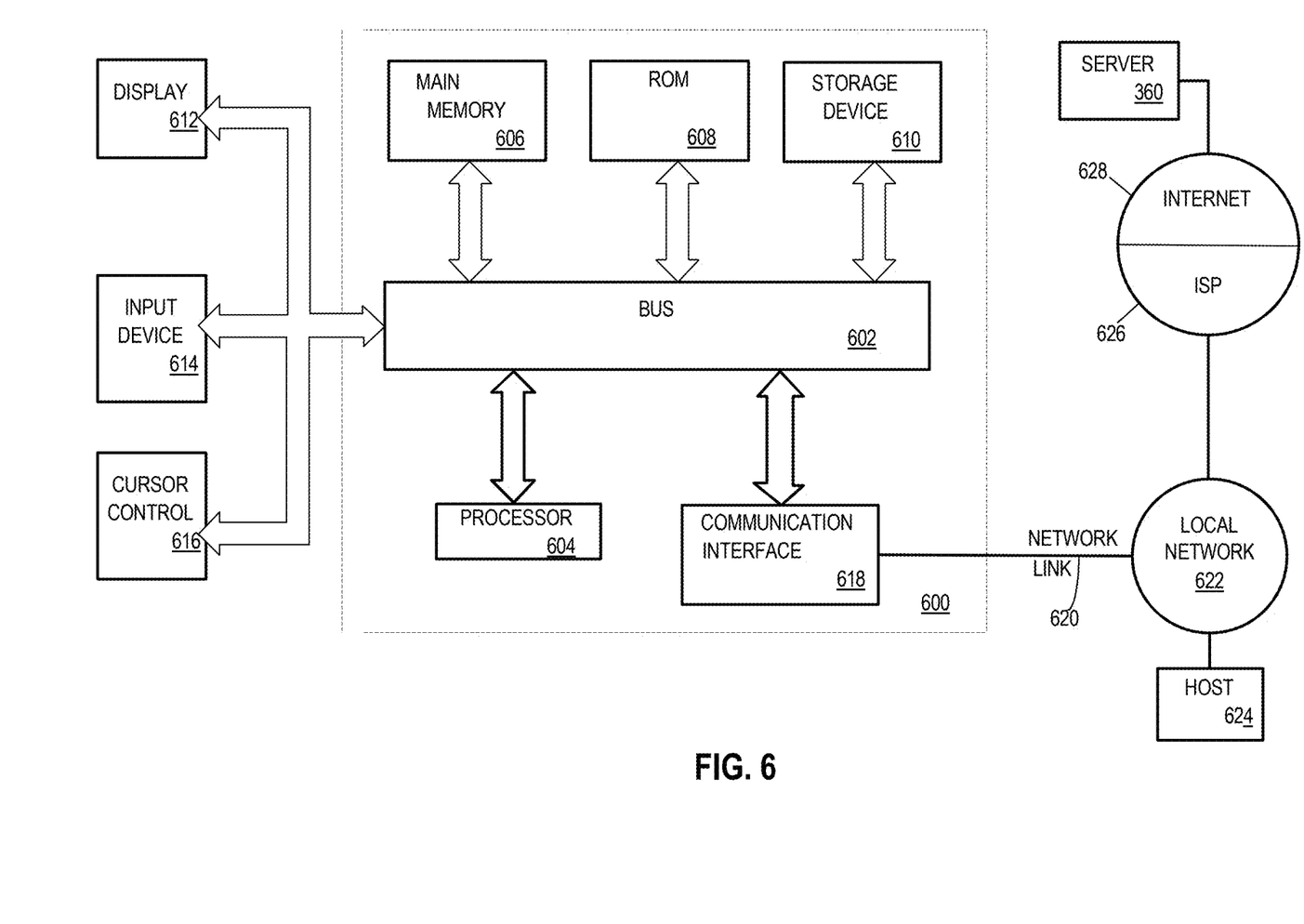
FIG. 6 is a block diagram that illustrates a computer system upon which an embodiment of the invention may be implemented.

One or more of the functions attributed to any process described herein, may be performed any other logical entity that may or may not be depicted in FIG. 6, according to one or more embodiments. In some embodiments, each of the techniques and/or functionality described herein is performed automatically and may be implemented using one or more computer programs, other software elements, and/or digital logic in any of a general-purpose computer or a special-purpose computer, while performing data retrieval, transformation, and storage operations that involve interacting with and transforming the physical state of memory of the computer.

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 6 is a block diagram that illustrates a computer system 600 upon which various embodiments of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk, optical disk, or solid-state drive is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 610. Volatile media includes dynamic memory, such as main memory 606. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid-state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic, or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the worldwide packet data communication network now commonly referred to as the "Internet" 628. Local network 622 and Internet 628 both use electrical, electromagnetic, or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

7. Software Overview

Figure 7:
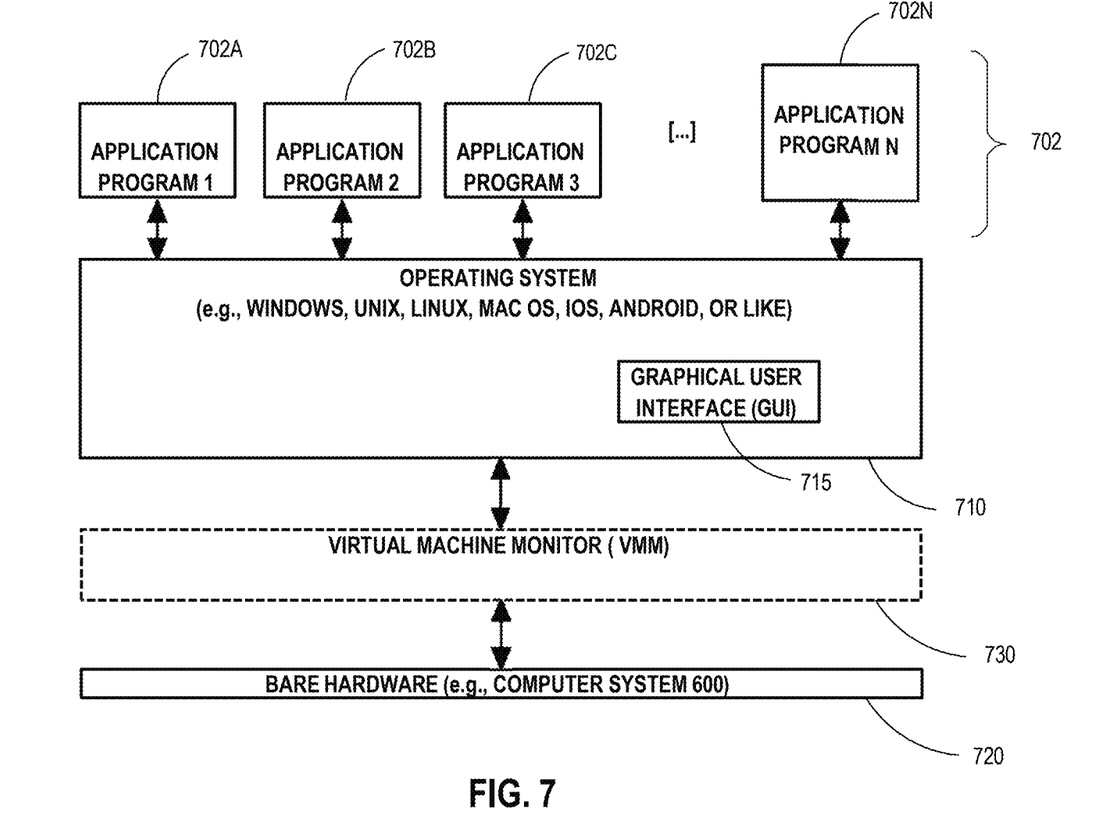
FIG. 7 is a block diagram of a basic software system that may be employed for controlling the operation of a computer system upon which an embodiment of the invention may be implemented.

FIG. 7 is a block diagram of a basic software system 700 that may be employed for controlling the operation of computer system 600. Software system 700 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 700 is provided for directing the operation of computer system 600. Software system 700, which may be stored in system memory (RAM) 606 and on fixed storage (e.g., hard disk or flash memory) 610, includes a kernel or operating system (OS) 710.

The OS 710 manages low-level aspects of computer operation, including managing execution of processes, memory allocation, file input and output (I/O), and device I/O. One or more application programs, represented as 702A, 702B, 702C . . . 702N, may be "loaded" (e.g., transferred from fixed storage 610 into memory 606) for execution by the system 700. The applications or other software intended for use on computer system 600 may also be stored as a set of downloadable computer-executable instructions, for example, for downloading and installation from an Internet location (e.g., a Web server, an app store, or other online service).

Software system 700 includes a graphical user interface (GUI) 715, for receiving user commands and data in a graphical (e.g., "point-and-click" or "touch gesture") fashion. These inputs, in turn, may be acted upon by the system 700 in accordance with instructions from operating system 710 and/or application(s) 702. The GUI 715 also serves to display the results of operation from the OS 710 and application(s) 702, whereupon the user may supply additional inputs or terminate the session (e.g., log off).

OS 710 can execute directly on the bare hardware 720 (e.g., processor(s) 604) of computer system 600. Alternatively, a hypervisor or virtual machine monitor (VMM) 730 may be interposed between the bare hardware 720 and the OS 710. In this configuration, VMM 730 acts as a software "cushion" or virtualization layer between the OS 710 and the bare hardware 720 of the computer system 600.

VMM 730 instantiates and runs one or more virtual machine instances ("guest machines"). Each guest machine comprises a "guest" operating system, such as OS 710, and one or more applications, such as application(s) 702, designed to execute on the guest operating system. The VMM 730 presents the guest operating systems with a virtual operating platform and manages the execution of the guest operating systems.

In some instances, the VMM 730 may allow a guest operating system to run as if it is running on the bare hardware 720 of computer system 600 directly. In these instances, the same version of the guest operating system configured to execute on the bare hardware 720 directly may also execute on VMM 730 without modification or reconfiguration. In other words, VMM 730 may provide full hardware and CPU virtualization to a guest operating system in some instances.

In other instances, a guest operating system may be specially designed or configured to execute on VMM 730 for efficiency. In these instances, the guest operating system is "aware" that it executes on a virtual machine monitor. In other words, VMM 730 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

The above-described basic computer hardware and software is presented for purposes of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

8. Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented method comprising:
receiving a graph pattern matching query;
determining that the graph pattern matching query is an unbounded recursive path query (RPQ);
initializing an unbounded root vertex match operator (UBRM), using a starting vertex as input to the UBRM, the UBRM configured to compute multiple hops between vertices on the graph;
performing a first reachability search using the UBRM, wherein the UBRM traverses the graph to identify all vertices reachable from the starting vertex;
generating, using the UBRM and in accordance with results of the first reachability search, first level vertices of a path pattern that computes the RPQ;
adding the first level vertices to a first level context of the first level for processing by a successor match operator, wherein the successor match operator comprises an unbounded intermediate neighbor match operator (UBNM), the UBNM configured to compute multiple hops between vertices on the graph and to identify neighbors for each of the first level vertices; and
performing a subsequent reachability search by the UBNM to generate second level vertices, wherein the second level vertices are added to a second level context of the second level.

2. The computer-implemented method of claim 1, wherein reachability neighbor iterators associated respectively with the UBRM and the UBNM trigger the first reachability search and the subsequent reachability search.

3. The computer-implemented method of claim 1, wherein the results of the first reachability search are included in an in-memory array that contains a distance from the starting vertex for all vertices reachable from the starting vertex.

4. The computer-implemented method of claim 3, wherein the distance is expressed as a number of hops.

5. The computer-implemented method of claim 1, wherein the UBRM and at least one of the UBNM, an intermediate neighbor match operator (NM), and a leaf neighbor match operator (LNM) comprise an execution chain for in-memory processing.

6. The computer-implemented method of claim 1, wherein the determining is in accordance with information from a parser in a semantic analyzer function.

7. The computer-implemented method of claim 1, wherein the initializing is performed using graph-related metadata.

8. The computer-implemented method of claim 1, wherein at least one of the first reachability search and the subsequent reachability search is performed using a breadth-first search (BFS) algorithm.

9. A non-transitory computer-readable medium comprising instructions executable by a processor to:
receive a graph pattern matching query;
determine that the graph pattern matching query is an unbounded recursive path query (RPQ);
initialize an unbounded root vertex match operator (UBRM), using a starting vertex as input to the UBRM, the UBRM configured to compute multiple hops between vertices on the graph;
perform a first reachability search using the UBRM, wherein the UBRM traverses the graph to identify all vertices reachable from the starting vertex;
generate, using the UBRM and in accordance with results of the first reachability search, first level vertices of a path pattern that computes the RPQ;
add the first level vertices to a first level context of the first level for processing by a successor match operator, wherein the successor match operator comprises an unbounded intermediate neighbor match operator (UBNM), the UBNM configured to compute multiple hops between vertices on the graph and to identify neighbors for each of the first level vertices; and perform a subsequent reachability search by the UBNM to generate second level vertices.

10. The non-transitory computer-readable medium of claim 9, wherein the second level vertices are added to a second level context of the second level.

11. The non-transitory computer-readable medium of claim 9, wherein reachability neighbor iterators associated respectively with the UBRM and the UBNM trigger the first reachability search and the subsequent reachability search.

12. The non-transitory computer-readable medium of claim 9, wherein the results of the first reachability search are included in an in-memory array that contains a distance from the starting vertex for all vertices reachable from the starting vertex.

13. The non-transitory computer-readable medium of claim 12, wherein the distance is expressed as a number of hops.

14. The non-transitory computer-readable medium of claim 9, wherein the UBRM and at least one of the UBNM, an intermediate neighbor match operator (NM), and a leaf neighbor match operator (LNM) comprise an execution chain for in-memory processing.

15. A system comprising:
a processor; and
a memory that stores executable instructions that, when executed by the processor, facilitate performance of operations, the operations comprising:
receiving a graph pattern matching query;
determining that the graph pattern matching query is an unbounded recursive path query (RPQ);
initializing an unbounded root vertex match operator (UBRM), using as input to the UBRM a starting vertex and graph-related metadata, the UBRM configured to compute multiple hops between vertices on the graph;

performing a first reachability search using the UBRM, wherein the UBRM traverses the graph to identify all vertices reachable from the starting vertex;
generating, using the UBRM and in accordance with results of the first reachability search, first level vertices of a path pattern that computes the RPQ;
adding the first level vertices to a first level context of the first level for processing by a successor match operator, wherein the successor match operator comprises an unbounded intermediate neighbor match operator (UBNM), the UBNM configured to compute multiple hops between vertices on the graph and to identify neighbors for each of the first level vertices; and
performing a subsequent reachability search by the UBNM to generate second level vertices, wherein the second level vertices are added to a second level context of the second level.

16. The system of claim 15, wherein reachability neighbor iterators associated respectively with the UBRM and the UBNM trigger the first reachability search and the subsequent reachability search.

17. The system of claim 15, wherein the results of the first reachability search are included in an in-memory array that contains a distance from the starting vertex for all vertices reachable from the starting vertex.

18. The system of claim 17, wherein the distance is expressed as a number of hops.

19. The system of claim 15, wherein the UBRM and at least one of the UBNM, an intermediate neighbor match operator (NM), and a leaf neighbor match operator (LNM) comprise an execution chain for in-memory processing.

20. The system of claim 15, wherein at least one of the first reachability search and the subsequent reachability search is performed using a breadth-first search (BFS) algorithm.

* * * * *